Dec. 25, 1962  F. W. ROBSON  3,070,216
RACKLESS CONVEYOR FOR DISHWASHERS
Filed June 25, 1958  3 Sheets-Sheet 1
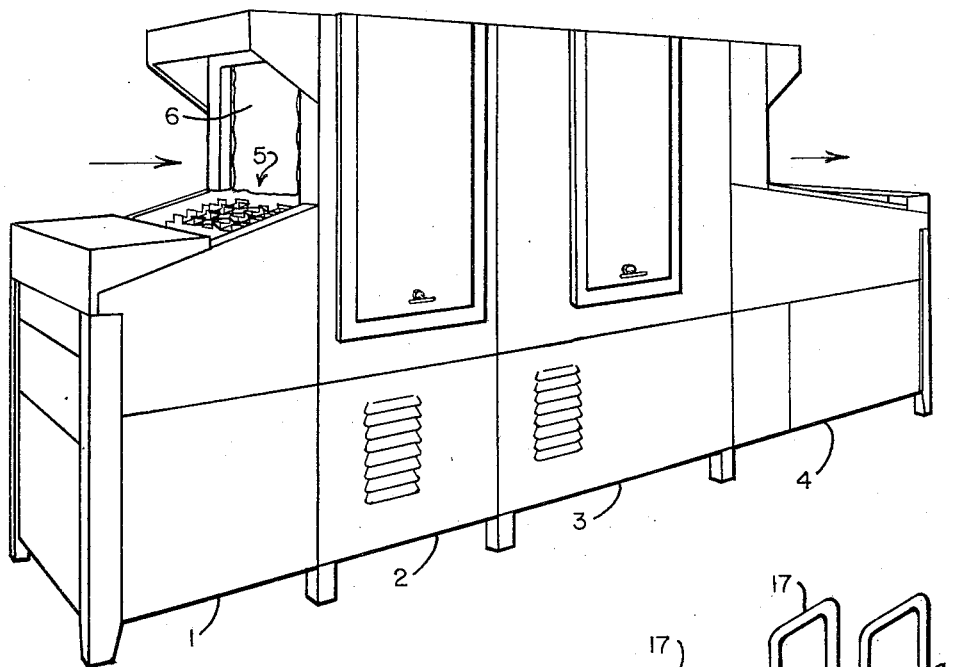
_Fig. I_
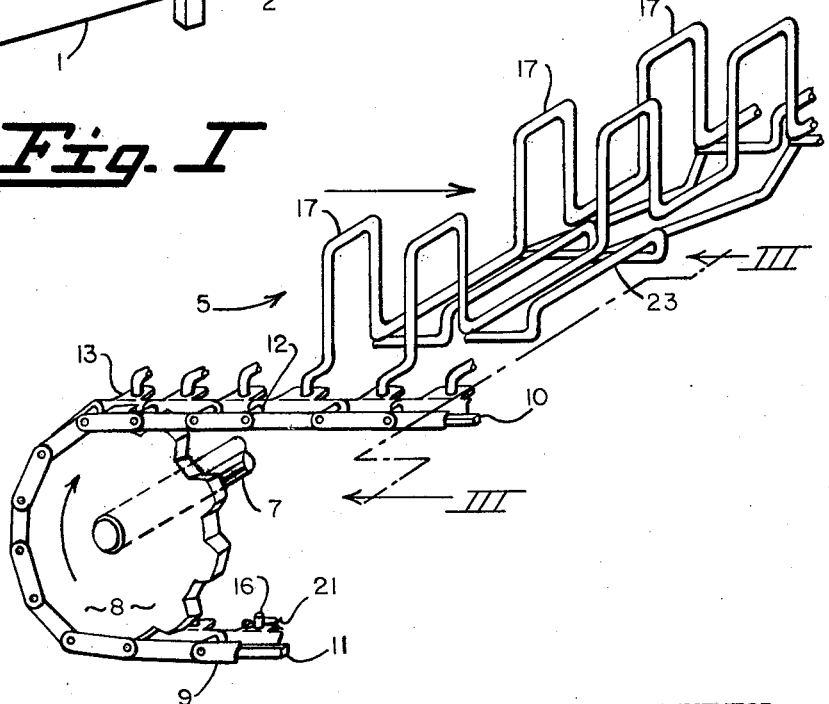
_Fig. II_
INVENTOR.
FREDERICK W. ROBSON
BY
Marshall, Marshall & Yeasting
ATTORNEYS Dec. 25, 1962 F. W. ROBSON 3,070,216
RACKLESS CONVEYOR FOR DISHWASHERS
Filed June 25, 1958 3 Sheets-Sheet 2
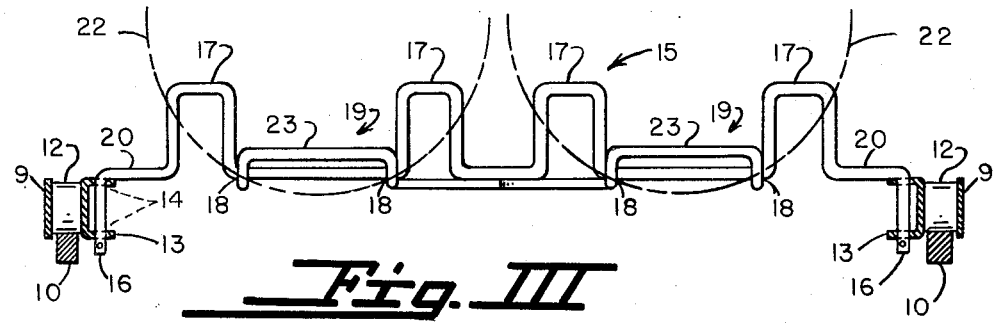
Fig. III
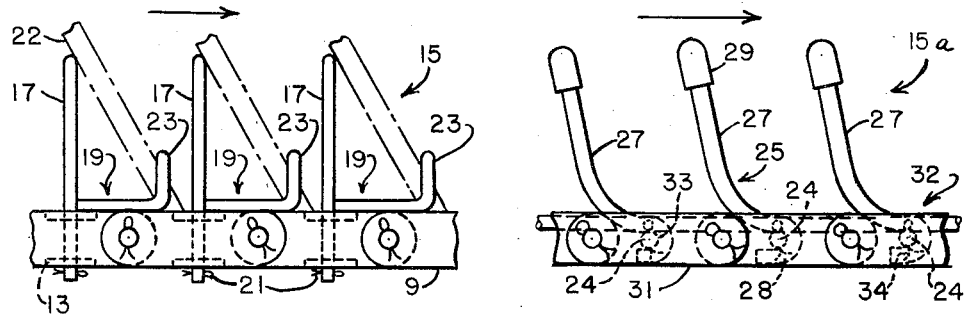
Fig. IV  Fig. V
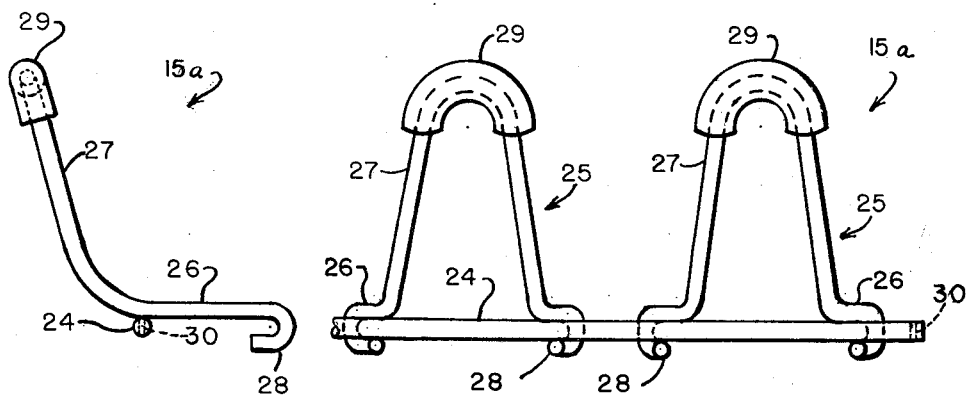
Fig. VI  Fig. VII
INVENTOR.
FREDERICK W. ROBSON
BY
*Marshall, Marshall & Yeasting*
ATTORNEYS Dec. 25, 1962  F. W. ROBSON  3,070,216
RACKLESS CONVEYOR FOR DISHWASHERS
Filed June 25, 1958  3 Sheets-Sheet 3
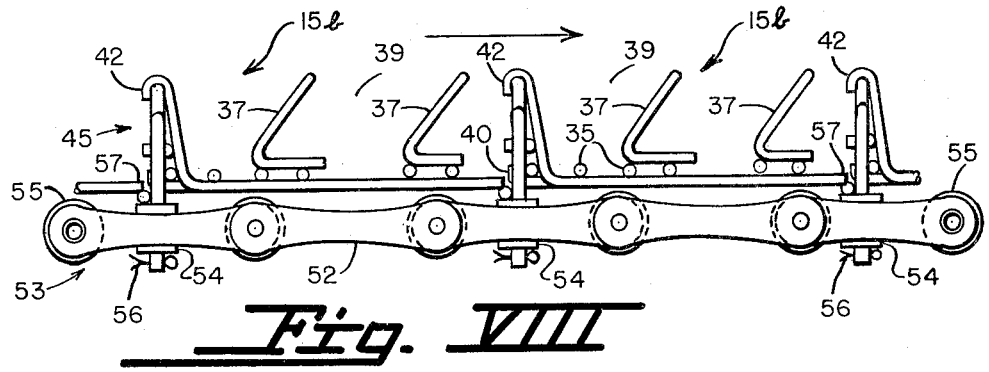
Fig. VIII
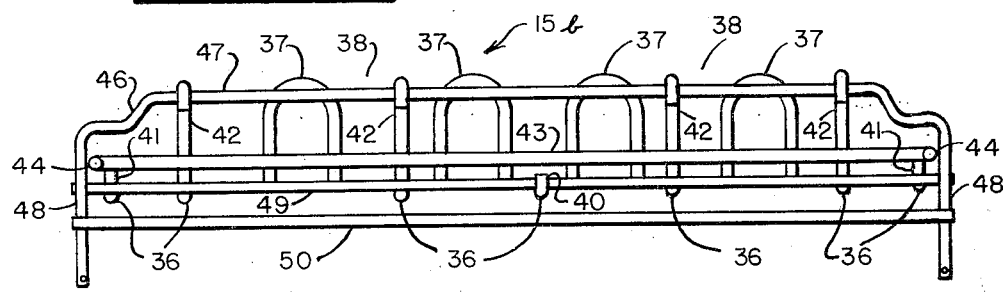
Fig. IX
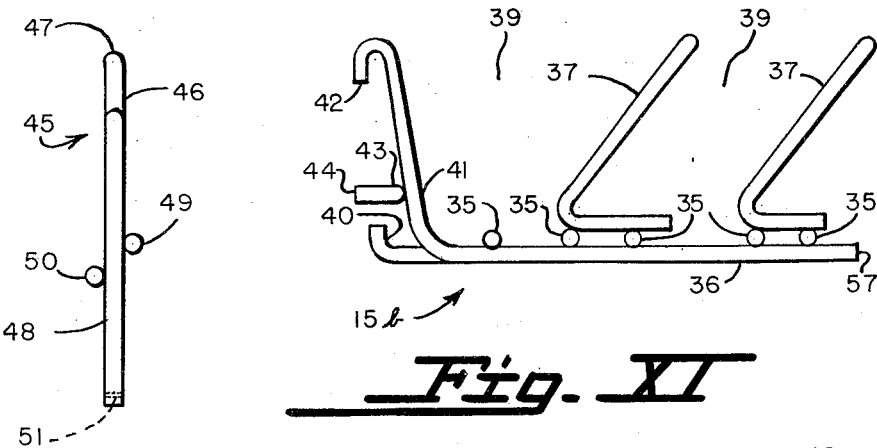
Fig. X
Fig. XI
INVENTOR.
FREDERICK W. ROBSON
BY
*Marshall, Marshall & Heasting*
ATTORNEYS

— -

United States Patent Office 3,070,216
Patented Dec. 25, 1962

3,070,216
RACKLESS CONVEYOR FOR DISHWASHERS
Frederick W. Robson, Rochester, N.Y., assignor to Toledo Scale Corporation, Toledo, Ohio, a corporation of Ohio
Filed June 25, 1958, Ser. No. 744,552
5 Claims. (Cl. 198—131)

This invention relates to commercial rackless conveyor-type dishwashers and in particular to improved conveyors for such dishwashers.

Heretofore, the conveyors in rackless conveyor-type dishwashers comprised groups of links aligned longitudinally of the conveyors to define a plurality of laterally extending recesses for receiving articles to be washed. The links in each group of links in the prior dishwashers were strung, like beads on a wire, on cross rods laterally of the conveyors to define a plurality of longitudinally extending recesses for receiving the articles to be washed. The cross rods extended the full width of the conveyors and when a link, which was in some cases made of plastic and in others of wire, in the center of a conveyor became broken or bent great difficulty was experienced in removing and replacing it, since several links had to be unstrung from the cross rods in order to remove the one broken link. Replacing such a link was particularly difficult when the broken link was located between tanks in a long two-tank or three-tank dishwasher.

It is, accordingly, the principal object of this invention to provide a commercial-type dishwasher with an improved rackless conveyor.

Another object of the invention is to provide, in a dishwasher, a rackless conveyor comprising a plurality of rugged plate frames each one of which extends laterally the full width of the conveyor and is in the form of an easily removable and replaceable independent unit assembly.

Further objects and numerous advantages will be apparent from the following description in which reference is had to the accompanying drawings.

According to the invention, a commercial-type dishwasher is provided with a rackless conveyor which includes a pair of continuous chains that form the side members of the conveyor and that carry a plurality of unique plate frames aligned in spaced relation longitudinally of the conveyor. The plate frames are designed to hold articles for quick thorough washing and rinsing. Each plate frame is an independent unit assembly that extends laterally the full distance between the chains and is easily removable and replaceable. Although the plate frames are rugged and difficult to damage, should one of the plate frames become damaged, it can be removed from the conveyor and replaced with a spare by the operator in a matter of seconds.

In the drawings, wherein a preferred embodiment and several modifications of the invention are shown:

FIG. I is a perspective view of a rackless conveyor dishwasher embodying the invention;

FIG. II is an enlarged, fragmentary perspective view of the rackless conveyor illustrated in FIG. I;

FIG. III is a vertical sectional view taken substantially along the line III—III of FIG. II;

FIG. IV is a side elevational view of the conveyor illustrated in FIG. III;

FIG. V is a side elevational view of a fragment of a modified rackless conveyor;

FIG. VI is a side elevational view of one of the plate frames illustrated in FIG. V;

FIG. VII is a fragmentary elevational view as seen from a position to the left of the plate frame illustrated in FIG. VI looking toward such frame;

FIG. VIII is a side elevational view of a fragment of another modified rackless conveyor;

FIG. IX is a rear elevational view of one of the plate frames and its support illustrated in FIG. VIII;

FIG. X is a side elevational view of the plate frame support illustrated in FIG. IX; and FIG. XI is a side elevational view of the plate frame illustrated in FIG. IX.

These specific figures and the accompanying description are intended to illustrate and describe a preferred form and several modifications of the invention, but not to impose limitations on its scope.

The commercial-type dishwasher which is illustrated in FIG. I is a two-tank machine and includes a loading unit 1, a prewash compartment 2, a wash and final rinse compartment 3, and an unloading unit 4. Dishes or other articles to be washed are placed upon the rackless conveyor 5 of the invention at the loading unit 1 and are carried through an entrance opening 6 into the prewash compartment 2 where they are cleansed of food particles by recirculating water. Upon completion of the prewashing step, the dishes are successively washed with soapy or detergent-containing recirculating water and rinsed with fresh hot water in the wash and final rinse compartment 3. Upon completion of the rinsing step, the articles are delivered through an exit opening to the unloading unit 4 from which they are removed.

A driven shaft 7 (FIG. II) provided with sprockets 8, only one of which is shown, is mounted at the loading end and a similar shaft supporting a pair of sprockets (not shown) is mounted at the unloading end, the latter shaft being power-driven. Continuous chains 9 extend around the sprockets forming side members of the rackless conveyor 5. The advancing flight of the conveyor 5 is supported on a pair of tracks 10 which extend longitudinally through the dishwasher and the return flight of the conveyor is similarly supported on tracks 11. Links of the chains are provided with rollers 12 which are adapted to ride on the tracks and with U-shaped plate frame supporting brackets 13 each having a pair of vertically spaced holes 14, the brackets 13 being carried on the inside surfaces of the chains as illustrated in FIG. III.

A plurality of plate frames 15, each one of which extends laterally the full width of the conveyor and is in the form of an easily removable and replaceable independent unit assembly, are mounted on the continuous chains 9 to form supporting and separating members for dishes and other articles to be washed. Each of the plate frames 15 is formed from two lengths of rod, one rod having arms 16 fitted into the holes 14 of a pair of oppositely located brackets 13 on the chains 9 and four upwardly projecting fingers 17 laterally spaced as illustrated in FIG. III and the other rod, which is welded to the first rod in four places at 18, having horizontally projecting arms 19 laterally spaced as also illustrated in FIG. III. After the rods are welded together they may be coated with a resilient plastic material to cushion the dishes.

The plate frames 15 are mounted on the side chains 9 by inserting the arms 16 into the holes 14 in the brackets 13 until shoulders 20 of the arms 16 contact the brackets, cotter pins 21 retaining the arms 16 in the holes 14. With each plate frame 15 thus mounted on a pair of oppositely located brackets, it is supported with its fingers 17 vertical and its arms 19 horizontal while advancing through the dishwasher. Each of the plate frames is spaced from its neighbors as illustrated in FIG. IV so that it is able to negotiate the turns at the sprockets without interference. The preferred manner of stacking the articles to be washed and rinsed on the conveyor is indicated in FIGS. III and IV, plates 22 being received upon the conveyor with their long dimensions extending crosswise thereof. In such position the flat sides of the articles are engaged against the fingers 17 while the lower edges are supported upon the turned up ends 23 of the arms 19 which arms extend generally in the direction of travel of the conveyor. Small articles, such as silverware and glasses, can be loaded into racks of the type commonly used in commercial dishwashers, the racks being placed on the upper ends of the fingers 17 for travel with the conveyor through the dishwasher.

Although the plate frames are rugged and difficult to damage, should one of the plate frames 15 become damaged, it can be removed from the conveyor by the operator in a matter of seconds, the operator merely removing two cotter pins 21 and slipping the one piece unit out of its plate frame supporting brackets 13. In addition to having the advantage of being much easier to repair than any rackless conveyor now known, the conveyor 5 has a low original cost because of its simple plate frames each of which consists of only the two welded-together rods. Also, the supporting of each plate frame 15 with its fingers 17 generally vertical and its arms 19 generally horizontal while advancing through the dishwasher and the design of the fingers and the arms permits the pitch of the frame, i.e., the longitudinal distance between the fingers as seen in FIG. IV, to be relatively small. Such pitch is a single pitch, there being a lateral row of plates 22 for every lateral row of fingers 17. This imparts a large carrying capacity to the conveyor. Because of its simplicity, low initial cost, ruggedness, low cost of maintenance, and large carrying capacity, a conveyor comprising the plate frames 15 is the preferred embodiment of the invention.

A modification of the plate frame 15 is illustrated in FIGS. V–VII. Plate frames 15a, like plate frames 15, extend laterally the full width of the conveyor and are in the form of easily removable and replaceable independent unit assemblies. Each plate frame 15a includes a hinge rod 24 having five support frames 25 welded thereto, the hinge rod 24 extending laterally the full width of the conveyor with the support frames 25 spaced therealong. The lateral spacing of the support frames 25 is indicated in FIG. VII, part of the hinge rod 24 together with three of the support frames 25 attached thereto being broken away in FIG. VII for simplicity of illustration. Each of the support frams 25 is formed from a single length of wire or rod and includes a forwardly projecting pair of arms 26 and an upwardly projecting pair of fingers 27. The ends of the arms 26 each are bent into hooks 28 and the fingers 27 are capped with cushioning tubing 29.

A hole 30 is provided at each end of the hinge rods 24 for attachment of the rods to chain lugs 31 of continuous chains 32. The chains 32 are generally similar to the chains 9, hereinbefore described, except instead of being provided with plate frame supporting brackets the lugs 31 each have a hole 33 therein with a horizontal axis into which holes the ends of the hinge rods 24 are inserted as shown in FIG. V. Cotter pins 34 through the holes 30 in the hinge rods 24 hold the rods 24 in place. The chains 32 form side members of the conveyor and extend around sprockets in the same way that chains 9 (FIG. II) do.

In assembling a plate frame 15a on the continuous chains 32, first, the hooks 28 are hooked over the hinge rod 24 of the preceding frame, then, the ends of the hinge rod 24 are slipped into a pair of oppositely located holes 33 in lugs 31, and the cotter pins 34 put in place. Hence, each plate frame 15a is supported in part on the preceding one; however, such support in a hinged support, the hooked ends of the arms 26 being rockable about the axis of the preceding hinge rod 24 to which they are hooked so that the plate frames are able to negotiate the turns at the ends of the dishwasher. The fingers 27 are aligned in spaced relation longitudinally, as shown in FIG. V, and laterally as shown in FIG. VII, of the conveyor in such manner as to define a plurality of longitudinally and laterally extending recesses for receiving articles to be washed. Articles, such as plates or dishes, preferably are received upon the conveyor with their long dimensions extending crosswise thereof in a manner similar to that shown in FIG. IV. In such position the flat sides of the articles are engaged against the cushioning tubing 29 on fingers 27 while the lower edges are supported upon the arms 26 which extend generally in the direction of travel of the conveyor. Small articles, such as silverware, can be loaded into racks of the type commonly used in commercial dishwashers, the racks being placed on the upper ends of the fingers 27 for travel through the dishwasher. Since the plate frames 15a are independent units, each one is easily removed by removing the hinge bar cotter pins 34, sliding the hinge bar out of the chain lugs, and unhooking the frame off of the hinge bar of the preceding frame.

Another modification of the plate frame 15 is illustrated in FIGS. VIII–XI. Plate frames 15b, like plate frames 15 and 15a, extend laterally the full width of the conveyor and are in the form of easily removable and replaceable independent unit assemblies. Each plate frame 15b includes five straight lengths of laterally extending rods 35 which are welded to seven lengths of longitudinally extending rods 36 to form a rigid network. Rods 35 are spaced longitudinally as shown in FIGS. VIII and XI and rods 36 are spaced laterally as shown in FIG. IX. Upwardly projecting pairs of fingers 37 are carried by the forward four of the five rods 35. The fingers 37 are aligned in spaced relation longitudinally, as shown in FIGS. VIII and XI, and laterally, as shown in FIG. IX, of the conveyor in such manner as to define a plurality of longitudinally extending recesses 38 and laterally extending recesses 39 for receiving articles to be washed and rinsed.

The left hand end of the middle one of the seven lengths of longitudinally extending rods 36 as viewed in FIG. XI is bent upwardly to form a hook 40; the left hand ends of the two end ones of the rods 36 are bent upwardly at 41; and the left hand ends of the remaining ones of the rods 36 are bent upwardly and then sharply downwardly to form four hooks 42. A sixth length of laterally extending rod 43 is secured to all, except the middle one, of the seven lengths of longitudinally extending rods 36. The ends of rod 43 are bent into rearwardly projecting limit stops 44. After the rods are welded together they are coated with a resilient plastic material to cushion the dishes.

The plate frames 15b each is mounted on the conveyor by means of a crossbar support 45 which extends laterally the full width of the conveyor. The crossbar support 45 is formed from three lengths of rod and includes a frame member 46 formed to have a horizontal portion 47 and a pair of vertical legs 48 and an upper rod 49 and a lower rod 50 welded to the legs 48 and each extending parallel to the horizontal portion 47 of the frame member 46. Holes 51 are provided in the ends of the legs 48 for attachment of the crossbar support 45 to the lugs 52 of continuous chains 53. The chains 53 are generally similar to the chains 9, hereinbefore described, except for a different spacing of their plate frame supporting brackets 54 relative to their rollers 55. The chains 53 form side members of the conveyor and extend around sprockets in the same way that chains 9 (FIG. II) do.

In assembling the plate frames 15b on the continuous chains 53, first, the crossbar supports 45 are secured to the chains by slipping their legs 48 into the holes of oppositely located brackets 54 on chain lugs 52 until the lower rods 50 contact the brackets, cotter pins 56 through holes 51 in the legs 48 retaining the legs in the brackets. Then, each plate frame 15b is snapped onto its crossbar support 45 by hooking the four hooks 42 over the horizontal portion 47 of the support in positions such that the rearwardly projecting limit stops 44 each is in juxtaposition with an inside surface of a leg 48 of the support, followed by hooking the single hook 40 under the upper rod 49 of the support. Forward ends 57 of the seven lengths of longitudinally extending rods 36 of the plate frame are supported on the lower rod 50 of the preceding crossbar support 45. However, such ends 57 are free to rise from their supported positions so that the plate frames 15b are able to negotiate the turns at the ends of the dishwasher without interference.

Articles, such as plates or dishes, preferably are received upon the conveyor with their long dimensions extending crosswise thereof in a manner similar to that shown in FIG. IV, the direction of travel of the conveyor being indicated by the arrow in FIG. VIII. Small articles, such as silverware, can be loaded into racks of the type commonly used in commercial dishwashers, the racks being placed on the upper ends of the fingers 37 for travel through the dishwasher. A plate frame 15b can be snapped on or off a crossbar support 45 in a matter of seconds. Hence, repair of the conveyor in the field consists in merely unhooking a damaged plate frame from its crossbar support and replacing it with a spare independent unit.

Various modifications may be made in specific details of construction without departing from the spirit and scope of the invention.

Having described the invention, I claim:

1. In a dishwasher, a continuous conveyor of essentially open construction comprising, in combination, a pair of continuous side members including longitudinally spaced pairs of rollers movable in a longitudinal direction through the dishwasher, a plurality of plate frames of unitary construction each of which extends laterally substantially the full width of the conveyor and each one of which includes members for supporting and separating articles to be washed and rinsed, the supporting members each having hooks hooked over the preceding frame, and readily detachable means for attaching the plate frames to the side members at locations intermediate the rollers.

2. In a dishwasher, a continuous conveyor according to claim 1 wherein the side members define a plurality of holes intermediate the rollers each having a horizontal axis, the holes in one of the side members being opposite to the holes in the other side member forming a pair of holes for each of the plate frames, and each of the plate frames includes a rod the ends of which are received in a pair of such pairs of holes.

3. In a dishwasher, a continuous conveyor of essentially open construction comprising, in combination, a pair of continuous side members movable in a longitudinal direction through the dishwasher, a plurality of plate frame supports carried by the side members each extending laterally between the side members, and a plate frame of unitary construction for each of the supports each hooked on its support and each, while advancing through the dishwasher, resting upon the preceding support.

4. In a dishwasher, a continuous conveyor according to claim 3 wherein extensions are provided on the side members each defining a set of spaced openings, the extensions on one of the side members being opposite to the extensions on the other side member forming a pair of extensions for each of the plate frame supports, a leg is provided at each end of each of the plate frame supports which is received in the spaced openings in an extension, and means are provided for retaining the legs in the openings.

5. In a dishwasher, a continuous conveyor according to claim 4 wherein the openings in each set of openings are vertically spaced while advancing through the dishwasher.

References Cited in the file of this patent

UNITED STATES PATENTS

| 1,130,377 | Collis | Mar. 2, 1915 |
| 1,463,011 | England | July 24, 1923 |
| 1,784,229 | Fox | Dec. 9, 1930 |
| 2,025,620 | Sneesby | Dec. 24, 1935 |
| 2,644,473 | Fox | July 7, 1953 |
| 2,656,032 | Stern | Oct. 20, 1953 |
| 2,981,401 | Cumming | Apr. 25, 1961 |